United States Patent [19]
Rhodes

[11] 3,744,638
[45] July 10, 1973

[54] OIL MOP AND METHOD OF USING SAME

[76] Inventor: Herbert M. Rhodes, 5419 Pratt Drive, New Orleans, La.

[22] Filed: Apr. 13, 1971

[21] Appl. No.: 133,580

Related U.S. Application Data

[63] Continuation-in-part of Ser. No. 52,448, July 6, 1970, Pat. No. 3,668,118.

[52] U.S. Cl............ 210/242, 210/396, 210/DIG. 21
[51] Int. Cl............................................. E02b 15/04
[58] Field of Search...................... 210/30, 40, 242, 210/396, 496, 503, 505, DIG. 21, 350–352

[56] References Cited
UNITED STATES PATENTS

| | | | |
|---|---|---|---|
| 3,537,587 | 11/1970 | Kain | 210/242 |
| 3,565,257 | 2/1971 | Cavalieri | 210/242 |
| 3,539,013 | 11/1970 | Smith | 210/242 |
| 3,607,741 | 9/1971 | Sohnius | 210/40 X |
| 3,617,566 | 11/1971 | Oshima et al. | 210/40 |
| 3,679,058 | 7/1972 | Smith | 210/242 |

FOREIGN PATENTS OR APPLICATIONS

| 1,187,605 | 4/1970 | Great Britain | 210/DIG. 21 |
|---|---|---|---|

Primary Examiner—Samih N. Zaharna
Assistant Examiner—Thomas G. Wyse
Attorney—Wilkinson, Mawhinney & Theibault

[57] ABSTRACT

The present disclosure is directed to a method of removing oil from the surface of a body of water with an oil mop made of thin gauge narrow strips of polypropylene or similar material passed through the oil on the surface of water and then through wringers and/or water or chemical sprays or both to remove the oil from the mop, depositing the oil in a receptacle and returning the non-oil ladened mop back into the oil covered water to pick up more surface oil.

3 Claims, 5 Drawing Figures

PATENTED JUL 10 1973 3,744,638

INVENTOR
HERBERT M. RHODES

Wilkinson Mawhinney Thibault
ATTORNEYS

INVENTOR
HERBERT M. RHODES

OIL MOP AND METHOD OF USING SAME

The present invention relates to AN OIL MOP AND METHOD OF USING SAME and is a continuation-in-part application of my similarly entitled application Ser. No. 52, 448, filed July 6, 1970, now U.S. Pat. No. 3,668,118 granted June 6, 1972.

An object of the present invention is the provision of AN OIL MOP AND METHOD OF USING SAME for removal of oil pollution when oil becomes accidentally spilled on the surface of a body of water either due to a drilling accident, casement fracture or tanker collision where large quantities of oil endanger fish, wildlife and property.

Another object of the present invention is an improvement over the McClintock U. S. Pat. No. 3,146,192 which while recognizing that sheet polypropylene can selectively remove all the oil from a water surface in the ratio of 1 gram of oil per 16 square inches of polypropylene surface, taught the art its application only in a large bulky cumbersome rig which cannot be used effectively in rough open seas and which will not work effectively in shallow water or snow due to the fact that its specific gravity is approximately 0.9 which is not sufficient for effective floatation when towing, or when there are waves which will cause it to submarine under the floating oil.

Accepting the physical principle announced in McClintock and realizing that it would be necessary to have huge unmanageable sheets of polypropylene to pick up any sizeable quantity of oil and that these sheets would be subject to wind, rain and sea conditions, and lack the minimum required buoyancy for effectiveness, I have invented a compact mass of thin gauge narrow strips of polypropylene in the form of a mop-like structure made into an endless line which when placed in the oil covered water has minimum resistance or no orientation requirements to sea and wind variables and which has the maximum amount of surface area of polypropylene to pick up oil in rough seas, shallow water and even snow and by the addition of sufficient buoyancy units, such as closed cell foamed polystyrene in rod form approximately three-eighths inch in diameter, weighing approximately 3.5 pounds per cubic foot interlaced into the rope along with polypropylene fibers.

With the foregoing and other objects in view, the invention will be more fully described hereinafter, and will be more particularly pointed out in the claims appended hereto.

In the drawings wherein like symbols refer to like or corresponding parts throughout the several views.

Figure 5:
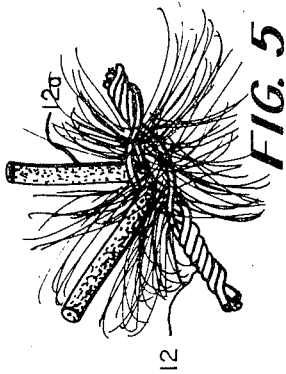
FIG. 5 is a short length of oil mop pull line showing the buoyancy rods interlocked therewith.
Figure 3:
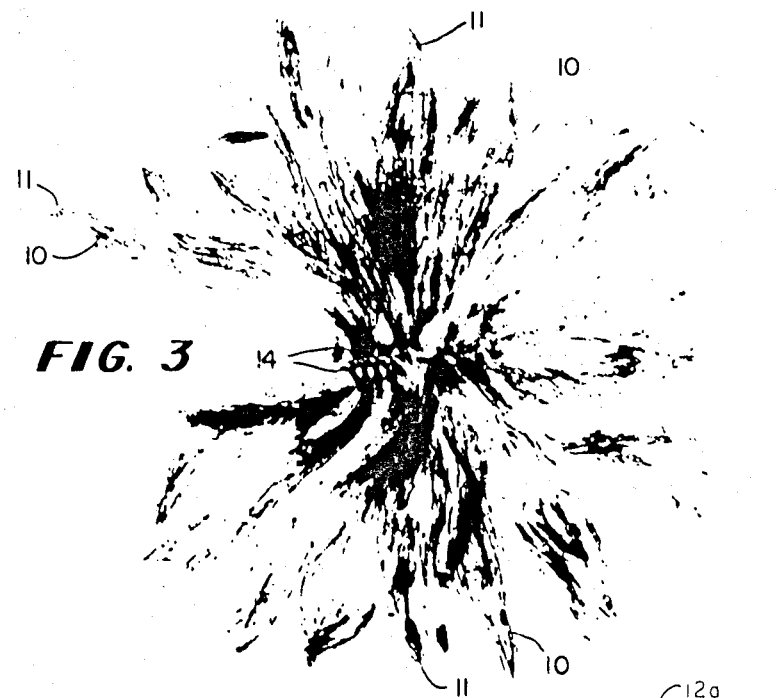
FIG. 3 is an end elevational view of the mop of the present invention showing the attachment of the groups of narrow polypropylene strips to a length of multi strand line.
Figure 4:
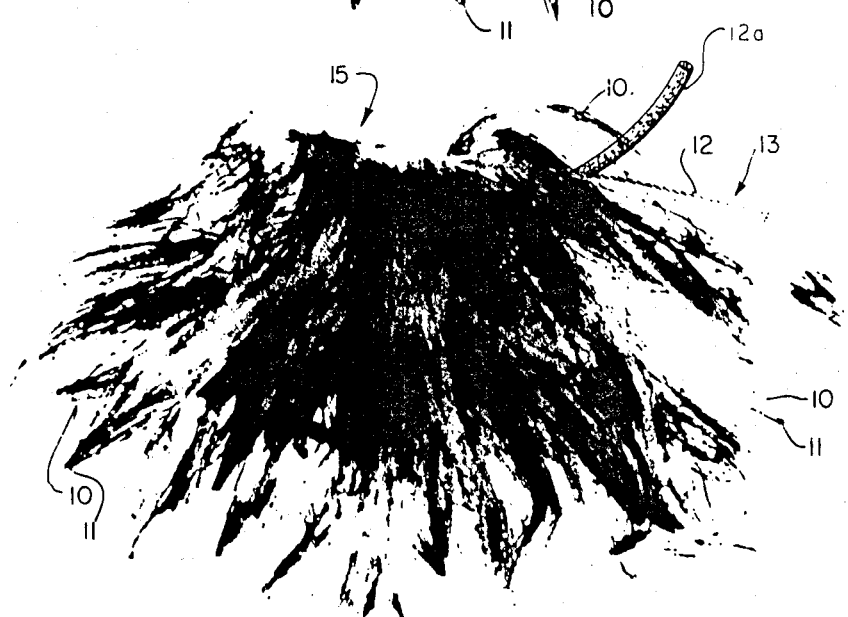
FIG. 4 is an end elevational view of the oil mop of the present invention showing the endless pull line broken away.

Referring to FIGS. 3 and 4, 10 designates a length of a plurality of thin gauge narrow strips of polypropylene, or similar material, having a specific gravity of less than 1.0, about 100 in number, the ends of which have been thermally fused at 11 to enhance the collection of oil. The groups 10 are cut from a length of tow which contains more than 100 strips in cross section. The lengths 10 may be from 2 to 5 feet in length. The lengths 10 are passed through or among the strands 12 of a multi-strand polypropylene rope or line 13 and attached to the line 13 to 14. Also passed through or among the strands 12 of the multi-strand polypropylene rope or line 13 at frequent intervals of about 4 to 6 inches along the line are buoyancy units 12A, shown in FIG. 5 such as closed cell foamed polystyrene in rod form 12A approximately three-eighths inch in diameter weighing approximately 3.5 pounds per cubic foot. This construction constitutes the basic mop 15 which may be of any length in the direction of the line 13, for example 100 or 1,000 feet. The line 13 is spliced upon itself to make an endless mop.

Figure 2:
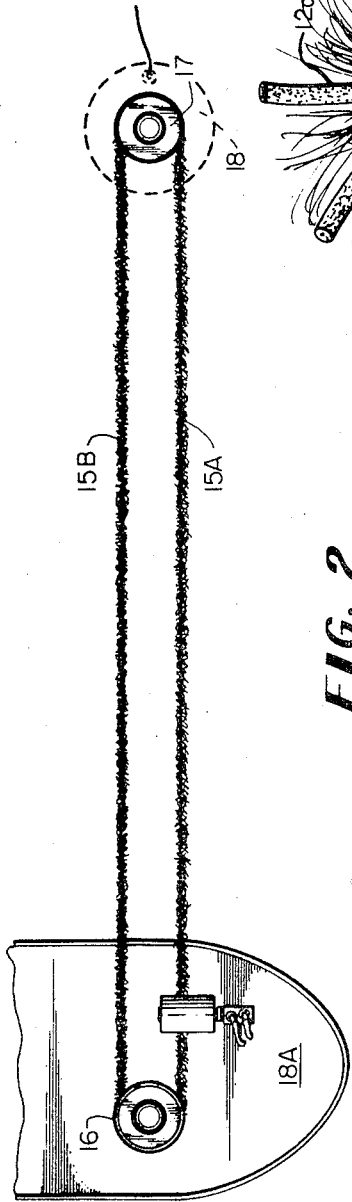
FIG. 2 is a top plan view of FIG. 1.
Figure 1:
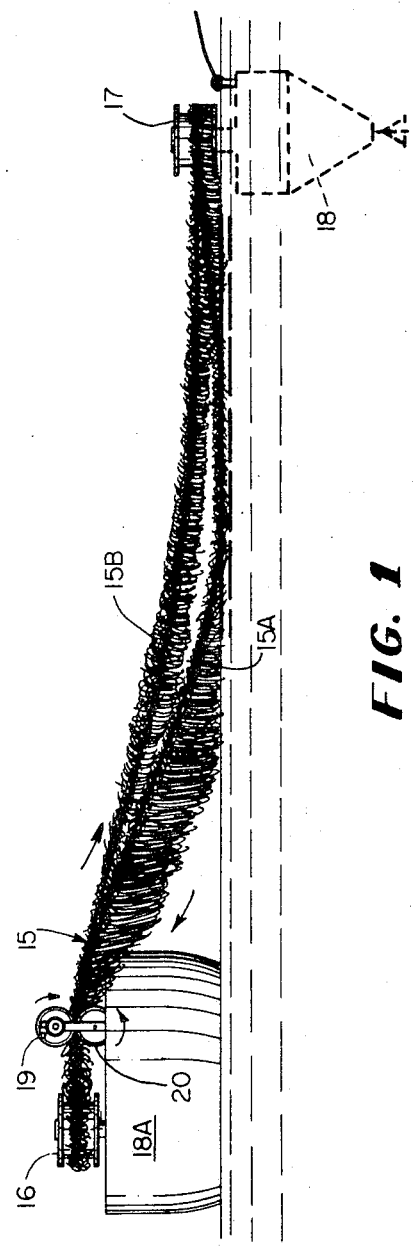
FIG. 1 is a side elevational view of an oil mop constructed in accordance with the present invention and shown being employed in accordance with the method.

As shown in FIGS. 1 and 2 the endless length of mop 15 is rooved about sheaves or pulleys 16 and 17 which are rotatably mounted on or near a barge or other support 18. Pulley 17 may be rotatably mounted on a buoy 18 which could be anchored or tied to a tug which would keep the mop partially taut and directed in the area where the oil pick up is desired. Located between the pulleys 16 and 17 and being closer to pulley 16 on oil recovery barge or receptacle 18A are a pair of pressurized power driven wringer rolls 19 and 20.

The barge or recovery receptacle 18A may be stationary, power driven, or towed to the polluted area and the mop 15 extended to the position of FIG. 1 with the run 15A being the pick up run and 15B being the return run.

The wringer rolls 19 and 20 when driven perform two functions, firstly, to move the mop from pulley 17 toward pulley 16 while secondly, squeezing the oil from the mop 15. The oil recovered is drained into the receptacle beneath the wringer rolls.

The gauge of the thin narrow strips of polypropylene I have found to be most successful is 4 mils and a range of from 1 mil to 12 mils is operative. The width of the narrow strips averages one-eighth inch.

The cross section of the polypropylene strips may be circular, square or rectangular and all have performed satisfactorily. The diameter of the circular sizes tested is 1 mil to 12 mils. The widths of the rectangular cross sections tested has ranged from 4 mils to one-fourth inch with a thickness of 4 mils to 12 mils. The most successful operation I have tested is with a 4 mil thickness with a range of widths of a few mils to one-fourth inch.

The most successful run on the mop to date has been 15 pounds of oil per pound of polypropylene per pass through the wringer.

What I claim is:

1. A device suitable for removing crude oil or oil products from a water surface comprising
   a. an endless length of polypropylene line
   b. multiple lengths of long narrow thin gauge strips of polypropylene extending radially off said polypropylene line and braided therein for floating on the water and capable of absorbing the oil or oil products, and
   c. means for squeezing the adsorbed oil or oil products from the strips of polypropylene.

2. A device suitable for removing crude oil or oil products from a water surface comprising a. long lengths of groups of thin gauge narrow strips of polypropylene
b. a length of multi-strand polypropylene line
c. said lengths of groups of narrow strips of polypropylene being braided in said multi-strand line so that the center of pull of said narrow strip groups is on the center line of the multi-strand line
d. and buoyancy means passed through and among the strands of said polypropylene line at spaced distances along said line.

3. A device as claimed in claim 2 wherein the buoyancy means are a plurality of closed cell foam polystyrene rods spaced along the line at 4 to 6 inch spacings.

* * * * *